Feb. 1, 1944.   C. P. GRIFFITH   2,340,743
REPEATING STOP MECHANISM
Filed May 14, 1941   5 Sheets-Sheet 1

Clement P. Griffith
INVENTOR.
BY Edmund W. E. Kamm
ATTORNEY.

Feb. 1, 1944.                C. P. GRIFFITH                2,340,743
                       REPEATING STOP MECHANISM
                      Filed May 14, 1941        5 Sheets-Sheet 2
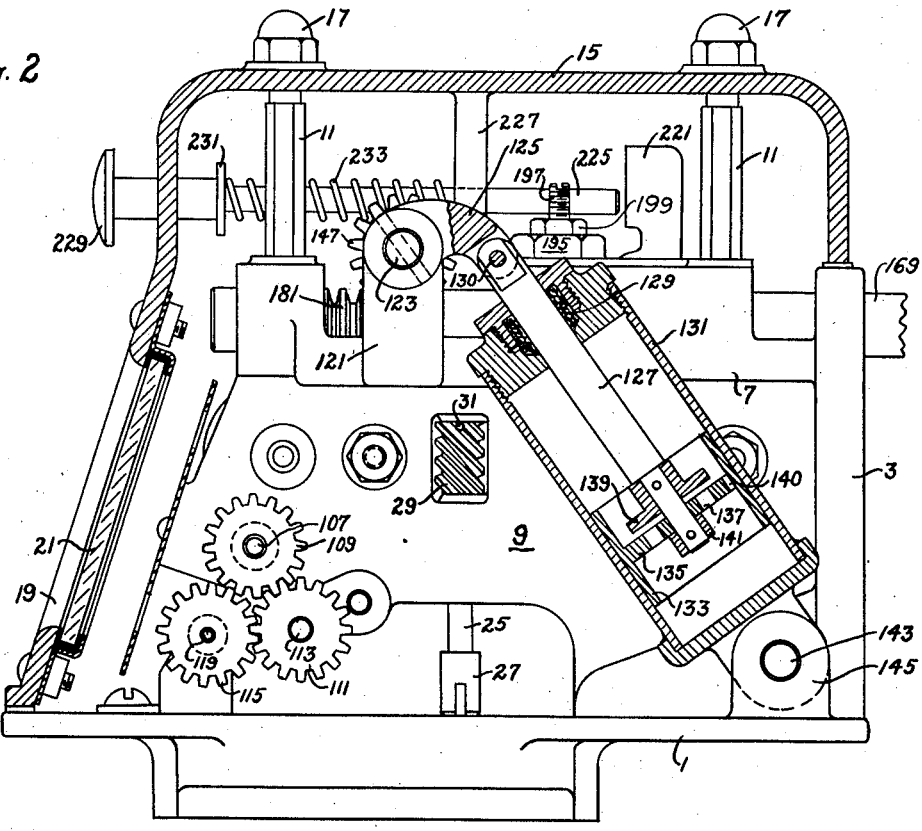
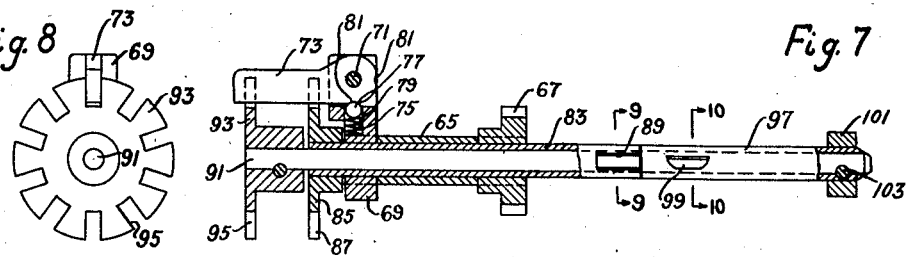
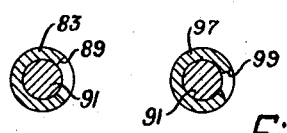
Clement P. Griffith
INVENTOR.
BY Edmund W. E. Kamm
ATTORNEY.

Feb. 1, 1944. C. P. GRIFFITH 2,340,743
REPEATING STOP MECHANISM
Filed May 14, 1941 5 Sheets-Sheet 3

Clement P. Griffith
INVENTOR.
BY Edmund W. E. Kamm
ATTORNEY.

Feb. 1, 1944.  C. P. GRIFFITH  2,340,743
REPEATING STOP MECHANISM
Filed May 14, 1941  5 Sheets-Sheet 4

Clement P. Griffith
INVENTOR.
BY Edmund W. C. Kamm
ATTORNEY.

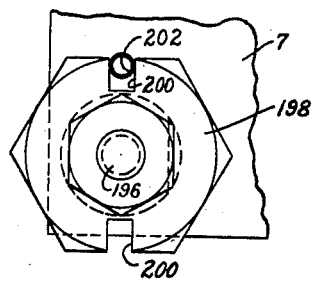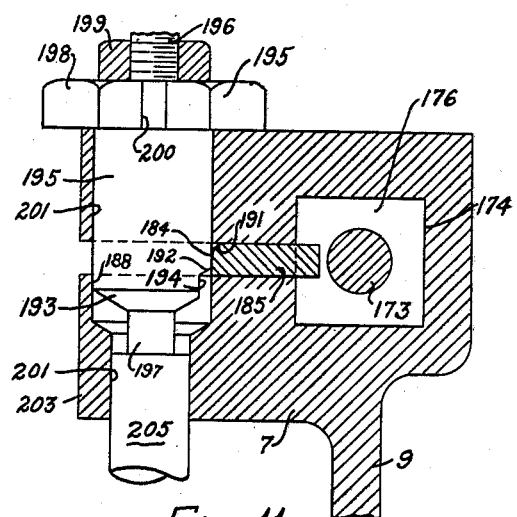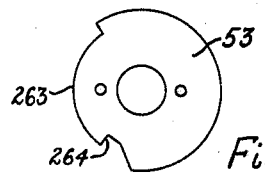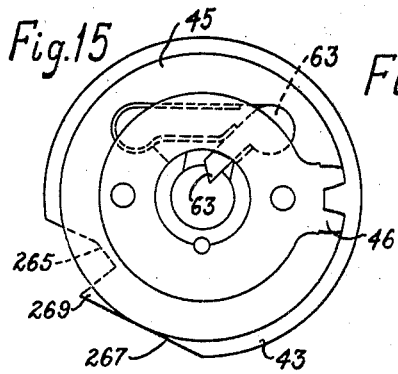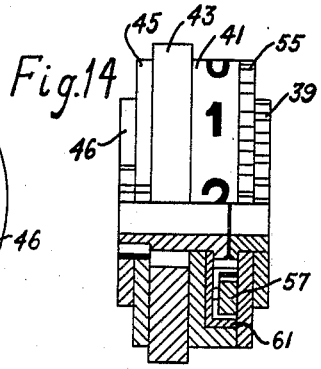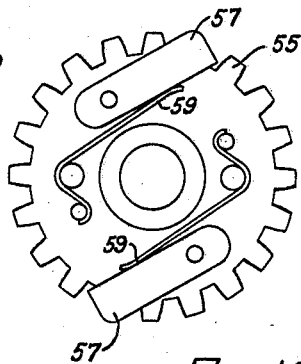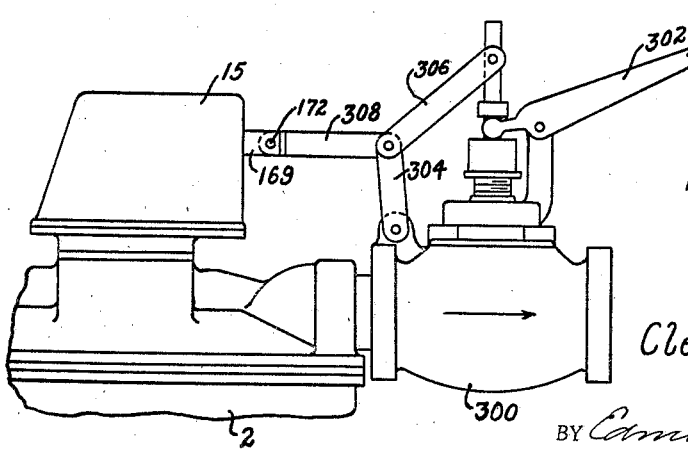

Patented Feb. 1, 1944

2,340,743

UNITED STATES PATENT OFFICE 2,340,743

REPEATING STOP MECHANISM

Clement P. Griffith, Fort Wayne, Ind., assignor to S. F. Bowser & Company, Incorporated, Fort Wayne, Ind., a corporation of Indiana Application May 14, 1941, Serial No. 393,385

18 Claims. (Cl. 235—132)

This invention relates to improvements in repeating stop mechanisms. More specifically, it relates to a liquid dispensing apparatus comprising a meter driven stop device which is adapted to actuate a valve to stop the flow of liquid through the meter when a preset quantity of liquid has passed through the meter and wherein the stop device is automatically reset upon closing of the valve to permit the dispensing of a like quantity of liquid as soon as the valve is again opened to start a succeeding operation.

It is an object of the invention to provide an apparatus of the kind described wherein a predetermined quantity is repeatedly discharged without manual operation of the presetting mechanism.

It is a further object of the invention to provide an apparatus of the kind described in which the presetting mechanism is automatically adjusted repeatedly for securing the delivery of like quantities.

It is still another object of the invention to provide a stop mechanism which is manually settable to select a quantity and automatically resettable to repeat said selected quantity.

Another object of the invention is to provide a stop mechanism which operates to gradually close the control valve.

Yet another object of the invention is to provide a novel two-stage valve closing mechanism.

Still another object of the invention is to provide a new and novel automatic presetting mechanism.

These and other objects will be apparent from a study of this specification in connection with the drawings which are attached hereto and made a part hereof and in which:

Figure 2 is a view taken on the line 2—2 of Figure 1 showing the dash pot in section.

Figure 7 is a view, partly in section, of the quantity presetting means.

Figure 8 is an elevation of the mechanism of Figure 7 viewed from the left.

Figure 9 is a section taken on the line 9—9 of Figure 8.

Figure 10 is a section taken on the line 10—10 of Figure 8.

Figure 11 is a sectional view of the latch locking mechanism taken on the line 11—11 of Figure 1.

Figure 12 is a plan view with parts broken away of the apparatus of Figure 11.

Figure 13 is an elevation of the tens cam.

Figure 14 is an elevation of the units indicator assembly shown partly in section.

Figure 15 is an elevation of the device of Figure 14 and viewed from the left thereof.

Figure 16 is an elevation of the indicator driving mechanism showing the driving pawls and pawl carrier.

Figure 17 is an elevation showing the meter, counter and the valve.

Figure 1:
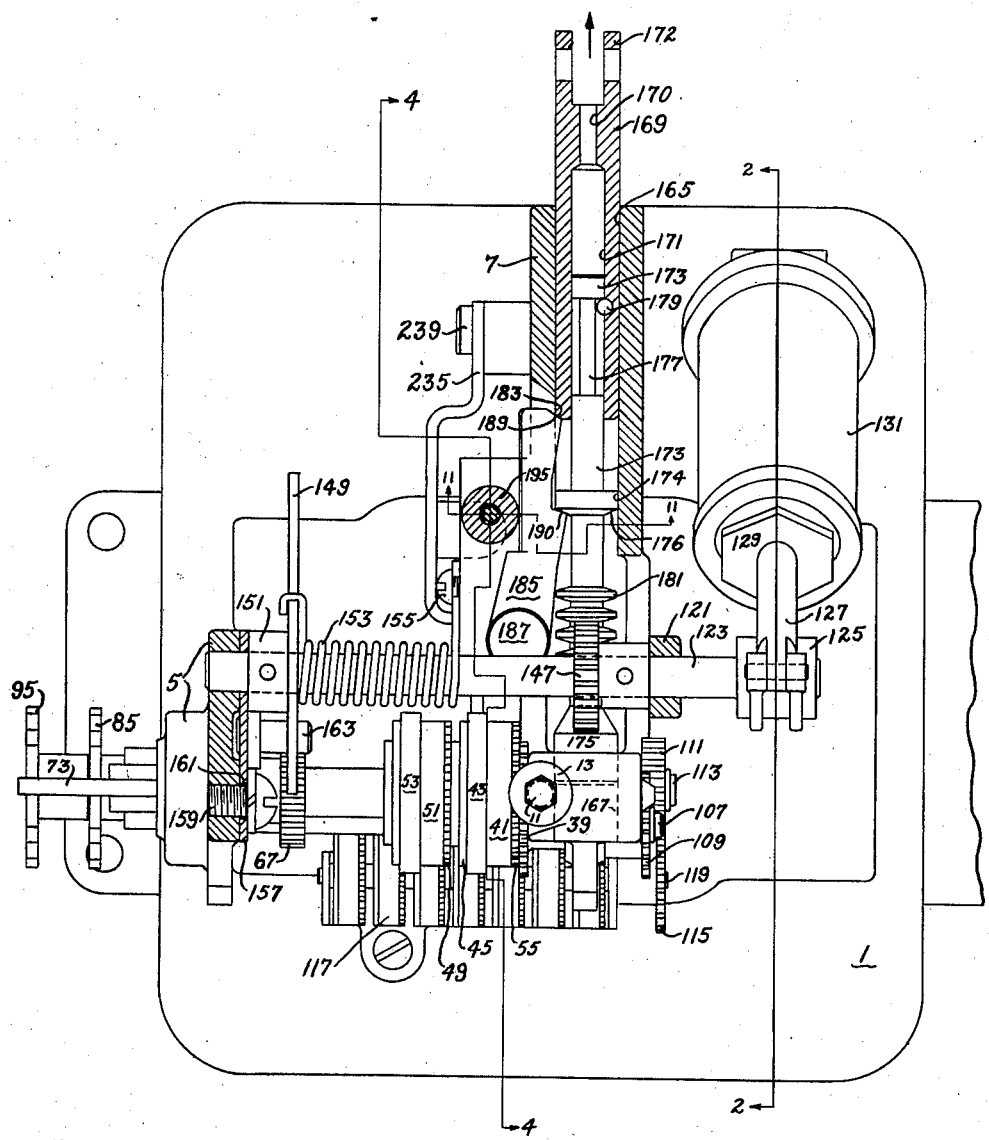
Figure 1 is a plan view of the device.

Referring now to Figures 1 to 4, the numeral 1 indicates a base which has formed integral with it upright frame members 3 and 5 and an integral transverse member 7 which is spaced from the base. A web 9 joins the base 1, and frame members 3 and 7. A pair of studs 11 are mounted in bosses 13 on the member 7 and a cover 15 is mounted on the studs by means of acorn nuts 17. The cover is provided with an opening 19 which is closed by a transparency 21.

Mounted in bearings 23 (see Figure 4) is a downwardly extending shaft 25 which is provided at its lower end with a coupling member 27 which is driven by meter 2. A worm 29 is disposed between the bearings and is connected to be driven by the shaft through pin 31.

Worm 29 drives a worm wheel 33 and a gear 35 which is attached to it. The elements 33 and 35 are mounted on a headed pin 37 which is mounted on the web 9. Gear 35 meshes with a gear 39 which is connected to drive a units presetting indicator 41 and a cam of tripping member 43 which is herein called a units cam. Also fixed to the cam is a locking disc 45. A mutilated transfer gear 46 cooperates with a transfer pinion 47 to drive the gear 49 of the second or tens presetting indicator 51. A cam 53 is integral with the indicator 51.

The gear 39 is integral with a gear 55 and the latter carries two pawls 57 which are urged outwardly by springs 59 into engagement with an internal ratchet 61 carried by the indicator 41 (see Figures 14 to 16). The pawls 57 are arranged to transmit motion from gears 39 and 55 to the indicator in a direction tending to drive the indicator toward zero but permit the indicator to be moved in the same direction independently of the gears so that the indicator may be preset.

A spring pressed pawl 63 is pivotally mounted on the indicator and projects through the hub thereof so as to engage a notch, later to be described. The pawl is arranged to yield when the indicator is rotated by the gearing as described so as not to impede the movement of the indicator. However, when the notch is moved in a direction to move the indicator toward the zero position, the notch will pick up the pawl and drive the indicator. The structure of the tens indicator is the same as the units indicator and its operation is similar.

The structure of the indicator presetting mechanism is shown in Figures 7 to 10. Rotatably mounted in a bearing in the upright member 5 is a sleeve 65 which has a gear 67 connected in driving relation with it at one end and a yoke member 69 fixed to it at the other end. Pivotally mounted on a pin 71 in said member 69 is a latch pawl 73. A radial bore 75 in said yoke member carries a ball 77 and a spring 79 which urges the ball outwardly into contact with one or the other of two spaced notches 81 in said latch pawl. The ball and spring thus serve as a detent for holding the pawl in one or the other of two positions which are preferably ninety degrees apart.

Mounted for rotation within said sleeve 65 is a second sleeve 83 which has fixed to it on the end adjacent the yoke 69, a disk 85 which is provided with notches 87, and which is provided at the opposite end with a slot 89. The disk 85 serves to rotate the sleeve 83.

A shaft 91 is rotatably mounted in the sleeve 83 and has pinned to it disk 93 which is provided with notches 95. A sleeve 97 is mounted on the other end of the shaft and is provided with a notch 99. A collar 101 is mounted on the sleeve 97 and a pin 103 holds the shaft 91, sleeve 97 and collar together so that all will turn together.

Referring again to Figure 4, it will be seen that the gear 39 drives a gear 105 which is mounted to drive a shaft 107 upon which the transfer pinion 47, mentioned above, is loosely mounted. Fixed to the shaft 107 on the side of the web 9, shown in Figures 1 and 2, is a gear 109 which meshes with a wide faced gear 111 mounted on a pin 113. The drive gear 115 of the cumulative counter 117 is mounted on a shaft 119 and meshes with the gear 111. The register 117 is an ordinary cyclometer and needs no further description.

Mounted between the standard 5 and a boss 121 on the web 9 is a shaft 123. Fixed on one end of the shaft (Figures 1 and 2) is a crank 125 to the outer end of which is attached a plunger rod 127 which extends through a stuffing box 129 into a cylinder 131. A piston 133 is fitted in the cylinder and is provided with a web 135 which is perforated centrally to permit passage of the plunger rod. By-pass ports 137 are also formed in the web. The rod 127 is provided with a valve 139 which is adapted to close the ports. The outer end of the rod is fitted with a collar 141 which is spaced from the valve a distance in excess of the thickness of the web so that the plunger rod may move relative to the web to enable the valve to open or close the ports. A bleeder port 140 is disposed in the web 135 beyond the valve 139 so that this port is constantly open.

The cylinder is pivotally mounted on a horizontal pin 143 set in a vertical boss 145 on the base 1 so that the cylinder is free to rotate substantially in the plane of the crank so as to prevent binding of the rod 127.

A gear 147 is fixed to shaft 123 adjacent the boss 121 and a gear sector 149 is fastened by its hub 151 to the shaft 123 at a point adjacent the standard 5. The sector is adapted to drive the gear 67 described above and is provided with an arcuate slot 152 (Figure 3).

Figure 3:
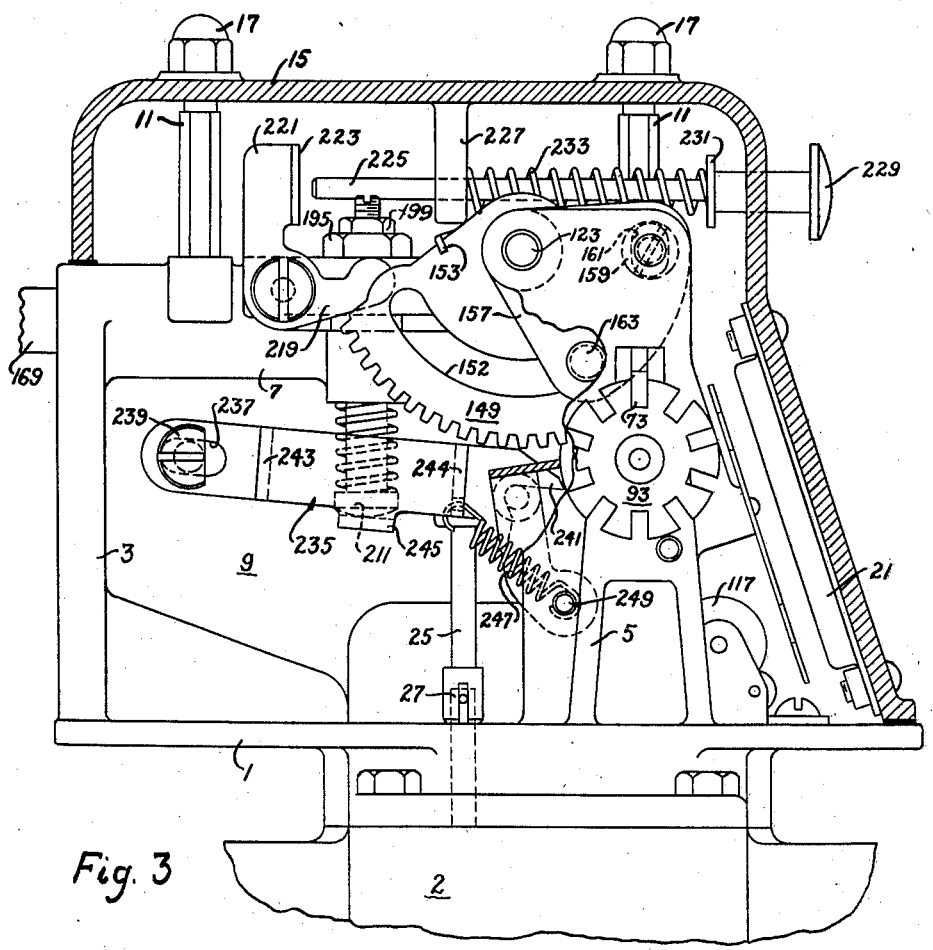
Figure 3 is an elevation of the device viewed from the left in Figure 1.
Figure 4:
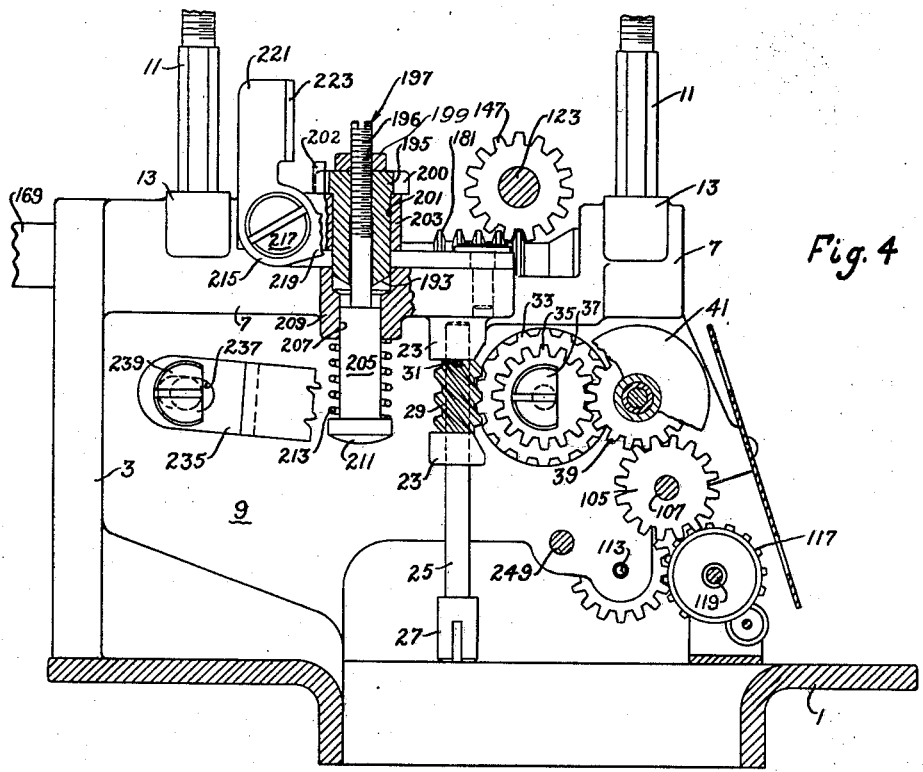
Figure 4 is a view taken on the line 4—4 of Figure 1 showing the latch control button.

A spring 153 is fixed at one end to the web 9 by means of a screw 155, is supported on shaft 123 and has its opposite end hooked about the edge of the sector 149 so that the spring tends to move the sector and shaft 123 in a counterclockwise direction when viewed in Figure 3.

A stop plate 157 is mounted for pivotal adjusting movement about shaft 123 and is held fixed in adjusted position by a screw 159 which passes through a slot 161 in the plate 157 and screws into the upright 5. The plate carries an abutment 163 which enters the slot 152 and serves to limit the counterclockwise movement (Figure 3) of the sector under action of spring 153 for the purpose of lining up the indicia on the indicator wheels 41, 51 with the window 21 in the cover 15 when the wheels are in zero position.

The transverse member 7 is provided with a bearing 165 which is in alignment with another bearing 167. A valve control element or operating bar 169, which is preferably square, rides in bearing 165 and is provided with an internal bearing 171 in which is received one end of a plunger 173. The other end 175 of the plunger slides in bearing 167. Thus the control element is made up of two relatively movable sections.

The end of the plunger which is received in the bearing 171 is recessed at 177 and a pin 179 cooperates with the recess to limit endwise movement of the plunger in both directions. An opening 170 is provided in the bar 169 and prevents air from being trapped behind plunger 173 and retarding the closing action of the valve. A clevis 172 is also provided for connecting the bar to the valve control linkage.

The plunger 173 is provided with a stop flange 174 which has a bevelled end 176 and with a rack 181 which meshes with the gear 147 on shaft 123.

The end of bar 169 adjacent the plunger 173 is bevelled at 183 at which point it is adapted to engage a latch pawl 185 which is pivoted at 187. The pawl (Figure 1) is provided with a bevelled end 189 which is adapted to contact the bevelled end or stop portion 183 of the bar 169. An inclined step or second stop 190 is provided on the pawl 185 intermediate the end 189 and the pivot 187 and this step engages the bevelled end 176 of the flange 174. The left-hand upper edge 191 of the pawl is rounded (Figure 11) so as to enable the pawl to more easily follow the bevelled contours 192 and 193 of the latch pawl lock 195.

The latch pawl lock is threadedly mounted on the upper end 196 of the push rod 197 (Figure 4) by means of screw threads and is held in adjusted position thereon by a locknut 199. It is guided in a bearing 201 in boss 203 which extends laterally from the boss 7 on the web 9. A flange 198 is formed at the upper end of the latch pawl lock and this is provided with diametrically opposed notches 200. A pin 202 is disposed at the side of the flange and is adapted to be received in one or the other of said notches. When the lock is turned so that one notch is occupied by the pin, that portion of the pin having the bevels 192 and 193 and the lands 184 and 194 is presented adjacent the pawl 185 and the valve 300 will be closed in two stages. However, when the pin 202 enters the other notch, then the side of the lock which has only the single bevel 193 and the land 188 will be disposed adjacent pawl 185 and the valve 300 will be closed in a single operation. The differences between these operations will be disclosed below. The pin 202 is of such length that operation of the mechanism will not displace the notch beyond the pin but the flange may be lifted high enough, manually, to permit the lock to clear the pin so that it may be rotated to one or the other of its positions.

The push rod 197 is provided with an enlarged portion 205 which is guided in a bearing 207 in boss 209 and with a button or head 211. A spring 213 is confined between the boss 209 and the head 211 and holds the latch pawl lock in its lowermost position.

An emergency release crank 215 is pivoted on a screw 217. One arm 219 underlies one side of the head of said lock 195 while the other arm 221 is provided with a bent over ear 223 which is positioned to be contacted by the emergency release rod 225 (Figures 2 and 3). The rod is supported in a web or boss 227 which projects downwardly from the case 115 while a push button 229 has bearing in an opening in the front face of the cover. A washer 231 bears against the hub of the button and serves as a seat for a spring 233 which is confined between said washer and the web 227. An inward push on the button 229 will rotate the crank 215 in a direction to lift the pawl lock and this action frees the pawl for rotation about its pivot to release the valve.

Figure 5:
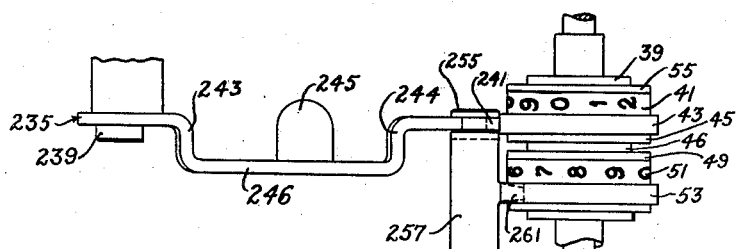
Figure 5 is a plan view of the tripping mechanism.

A knockout lever 235 (Figures 3, 5 and 6) is provided with an elongated slot 237 at one end which is supported on a headed pin 239. The end opposite the slot is provided with a hook 241. The lever is bent outwardly at 243 and inwardly at 244 to form a bowed or offset portion 246. A lip 245 is bent inwardly from this portion and lies under the button 211. Thus an upward pivoting movement of the lever (Figure 3) will raise the pawl lock 195 as described above.

A spring 247 is fixed at one end to a shaft 249 and is hooked through a hole 251 in lever 235 so that it tends to draw the hook 241 in a direction to contact the cam 43 of the units indicator 41. The lever 235 is provided with a recess 253 which engages a headed pin 255 mounted on a U-shaped bail 257. The depending arms 259 of the bail are mounted to rock on the shaft 249. A projection 261 is formed integrally with the bail and is adapted to engage and follow the cam 53 which is driven by the tens indicator 51.

The cam 53 is provided with an elongated step 263 which has a radius somewhat less than the greater portion of the cam. This step reaches from a position adjacent the numeral 3 to a position adjacent the zero indicia where it merges with a notch 264 of even less radius. When the projection 261 on the bail and the step 263 are aligned, the bail will permit the hook 241 of lever 235 to advance part way but when the projection 261 drops into the notch, the hook 241 is permitted its full travel.

The cam 43 is provided with a notch 265 and a depression 267 which form a tooth 269 which actuates the knockout lever 235 in a manner to be described below.

Cam tooth 269 is so disposed relative to the transfer pinion that it will pass the hook 241 before the transfer between the units wheel and the tens wheel occurs.

Operation

Assuming that the apparatus is to be used upon a meter which is operating on a line carrying liquid at a high velocity or on a line of large diameter, in such cases it is usually required that the valve 300 be closed in two steps to avoid creating impact in the lines commonly called "water hammer." In order to operate in two stages the latch pawl lock 195 must be raised and turned so that the portion having the two bevels 192 and 193 lies adjacent the latch pawl 185. The lock may then be lowered so that the proper groove 200 is engaged by the pin.

It is then necessary to adjust the presetting mechanism to predetermine the quantity of liquid to be dispensed at each operation of the machine. This is effected by lifting the latch pawl 73 of free the disks 85 and 93 for rotation. Rotation of the disk 93 in the clockwise direction (Figure 3) will cause the notch 99 (Figure 7) to pick up the pawl 63 of the units indicator 41 and to advance it to the desired indicia. Since the gear 55 of this indicator is held against rotation by the meter, the pawls 57 within this indicator permit ratchet 61 to slip over them to permit the setting of the indicator.

Similarly, rotation of disk 85 in a clockwise direction (Figure 3) causes the notch 89 to engage pawl 63 of the tens indicator 51 which is accordingly advanced to the desired indication. Thereafter the latch pawl 73 is replaced in the notches 87 and 95 of the disk 85 and 93, which notches are so spaced that they are in alignment when the indicia on the indicators are aligned. The latch is held in the notches by the detent 77—79.

The next operation is the opening of the valve 300. The valve lever 302 is depressed and this serves to actuate linkage 304, 306 and 308 to draw the bar 169 in the direction of the arrow in Figure 1. During this movement the sleeve section of bar 169 moves out of abutting relation with respect to the stop flange 174 and moves relative to it until the pin 179 riding in the recess 177 picks up the plunger 173 and causes the rack 181 to rotate gear 147, shaft 123 and sector 149 in a clockwise direction (Figure 3) and spring 153 is stressed. Rotation is transmitted in a counter-clockwise direction from sector 149 to the gear 67 and consequently through sleeve 65, yoke 69, pawl 73, disks 93 and 85, shaft 91, sleeve 97 and notch 99 and sleeve 83 and notch 89. The effective rotation of gear sector 149 and the ratio between the sector and gear 67 are such that the gear and its associated parts are driven one revolution in the counter-clockwise direction. While the notches 89 and 99 are thus rotated, they do not move the indicators 51 and 41 because the pawls thereof ride idly over the notches.

Rotation of shaft 123 as described above also turns lever 125 in a counter-clockwise direction (Figure 2) and causes the plunger 127 to be raised. This motion is also transmitted to the valve 139 which thereupon uncovers ports 137 and when the collar 141 contacts the web 135 of the piston 133, the latter will be drawn upwardly. The oil with which the cylinder 131 is filled, passes freely through the ports 137 and 149 so that little resistance will be offered to the motion of the piston. The cylinder pivots about pin 143 so that the pin connection 130 between the rod 127 and lever 125 may be relieved of excess strain.

As the bevelled ends 183 and 176 of bar 169 and flange 174 respectively are drawn beyond the bevelled edge 189 and step 190 of pawl 185, the spring 213 (Figure 4) will draw the pawl locking member 195 downwardly so that the bevels 193 and 192 of the lock will successively engage the rounded edge 191 of the pawl and force the pawl in a clockwise direction (Figure 1) so that land 184 will block the return of the bar 169 and plunger 173 under action of the valve spring (not shown).

When the valve is opened, the meter 2 drives coupling 27, shaft 25, worm 29, worm wheel 33, gears 35, 39, the units wheel clutch and the units indicator in a decreasing direction, that is, from the number which was preset back toward zero. The transfer pinion 47 transmits the rotation of the units indicator to the tens indicator so that the latter has its reading reduced one unit for every revolution of the units indicator.

The gear 39 also drives the cumulative counter 117 in a forward or reading increasing direction through the gear 105, shaft 107, gears 109, 111, 115 and shaft 119. This register discloses the total gallons dispensed over a series of dispensing operations.

Figure 6:
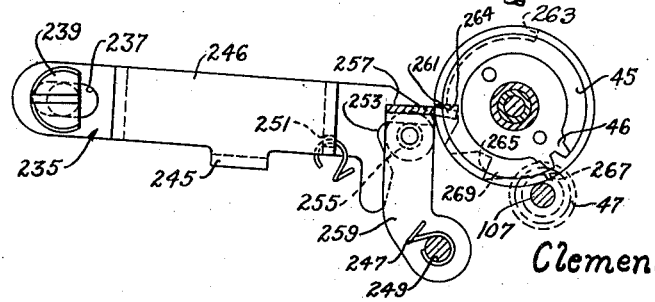
Figure 6 is an elevation of the mechanism of Figure 5.

When the tens counter is advanced to the thirty gallon position, the intermediate step 263 of the cam will be disposed adjacent the follower 261 so that the bail 257 will be rotated slightly in a clockwise direction (Figure 6). This permits the hook 241 of knockout lever 235 to bear against cam 43 on the units wheel and to be picked up by the tooth 269 when it next passes. This will cause an actuation of the lever 235 in a counter-clockwise direction (Figure 6) and this in turn lifts the button 211, plunger 205, screw 196 and the lock 195 far enough to bring land 184 of the lock above the level of pawl 185 and this permits the pawl to be forced in a counter-clockwise direction (Figure 1) a distance sufficient to release the bevelled end of the bar 169. The latch pawl 185 will be held in its intermediate position by its engagement with land 194. The thrust of the valve spring and the bevels 183 and 189 serve to displace the pawl as described. The pawl is not permitted to move a sufficient distance to release the flange 174 from the step 190 of the pawl and the valve will accordingly close only part way. The position of the valve is determined by the point of contact between the end of bar 169 and the flange 174.

Dispensing will continue at a reduced rate and while the lever 235 will be actuated each time the tooth 269 passes, its amplitude of motion is no greater than it was the first time and the lock will not therefore be operated.

However, when the transfer occurs which advances the tens indicator from the ten gallon to the zero indicating position, the follower 261 on bail 257 will enter the notch 264 in the cam 53 and the bail will be moved further in a clockwise direction (Figure 6) and will permit the hook 241 to enter notch 265 to a greater depth so that when the tooth makes its final trip past the hook, the latter and lever 235 will be actuated through a greater amplitude than formerly and the lock 195 will therefore be raised a distance sufficient to lift land 194 beyond the level of the pawl 185 with the result that the valve spring and the bevel 176 acting on step 190 will cam the pawl 185 out of the way and both the bar 169 and plunger 173 will move toward valve closing position.

As the plunger 173 moves, the rack 181 rotates gear 147 and shaft 123 counter-clockwise (Figure 4) quickly for a distance sufficient to close the valve in the flow line and thereafter the valve 139, in the dash pot 131, closes the orifices 137 so that the continued motion of shaft 123 under the action of spring 153 will be checked, the rate of return being dependent upon the size of the constantly open orifice 140, the load and the viscosity of the oil in the cylinder.

As the shaft 123 and sector 149 are driven toward the position in which stop pin 163 engages the end of slot 152, the sector drives gear 67 and consequently sleeve 65, yoke 69, pawl 73, disks 85 and 93, sleeve 83, shaft 91, sleeve 97 and consequently the pickup notches 99 and 89 to the position they occupied at the time the valve was opened. The notches pick up the pawls 63 of the units and tens indicator wheels 41 and 51 respectively and return them to the positions to which they were originally set as described above. The apparatus is accordingly prepared for another operation to dispense a like quantity.

If it is not necessary to operate the valve in two steps, the lock 195 is set so that the side having only the bevel 183 lies adjacent the pawl 185.

The operation of the apparatus is the same as that described above with the exception that since the amplitude of motion given the lock when the cam follower 261 engages the step 263 on the cam 53 and the hook 241 is thereafter actuated by tooth 269, is not sufficient to raise the land 183 above the level of pawl 185, there will be no release of the pawl at the thirty gallon point. However, when the follower 261 enters the notch 264 of cam 53, the knockout lever 235 will be actuated to a greater degree, and the lock will be lifted so that the land 188 will be above the level of latch 185 and the latter will be forced out of the way of both the bevelled end of bar 164 and of the flange 174 so that the valve will move to its closed position in one step. The resetting of the indicators 41 and 51 will thereafter be automatically accomplished in the manner described above so that to repeat the delivery it will be necessary merely to again open the delivery valve.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a stop mechanism, the combination of a driven member, a control element mounted for movement between starting and stopping positions, latch means for holding said element in starting position, selectively presettable means for rendering said latch means ineffective, to permit movement of said element to stopping position upon a predetermined operation of said driven member, and automatic means, rendered operable upon movement of said control element to stopping position, for resetting said presettable means to repeat said predetermined operation of said driven member when said control element is thereafter moved to starting position.

2. In a stop mechanism, the combination of a driven member, a control element mounted for movement between starting and stopping positions, latch means for holding said element, presettable means actuated by said driven member for actuating said latch means from effective position, said latch means being selectively adjustable to permit movement of said element to stopping position in one or two stages.

3. In a stop mechanism, the combination of a driven member, a control element mounted for movement between starting and stopping positions, latch means for holding said element, presettable means actuated by said driven member for actuating said latch means from effective position, said latch means comprising a pawl, a lock for said pawl, said lock being provided with a plurality of groups of contours for controlling the extent of release of said pawl from said control element and being selectively settable to effect the return of said element to stopping position in one or two stages, depending upon the group contours associated with said pawl.

4. In a stop mechanism, the combination of a driven member, a control element mounted for movement between starting and stopping positions, latch means for holding said element, presettable means actuated by said driven member for actuating said latch means from effective position, said latch means comprising a pawl having two abutments adapted to hold said control element, a lock for said pawl provided with two groups of control means, one group adapted to cooperate with said pawl to free said control element from both abutments of said pawl simultaneously, and the other group adapted to free said control element from said pawl in succession.

5. In a stop mechanism, the combination of a driven member, a control element mounted for movement between starting and stopping positions, latch means for holding said element, presettable means actuated by said driven member for actuating said latch means from effective position, said latch means comprising a pawl having two abutments adapted to hold said control element, a lock for said pawl provided with two groups of control means, one group adapted to cooperate with said pawl to free said control element from both abutments of said pawl simultaneously, and the other group adapted to free said control element from the abutments of said pawl in succession, means mounting said lock for adjustment to position one or the other of said groups of control means in cooperating relation with said pawl, and means for retaining said lock in adjusted position.

6. In a stop mechanism, the combination of a driven member, a control element, comprising two relatively movable sections, mounted for movement between starting and stopping positions, latch means for holding said element, presettable means actuated by said driven member for actuating said latch means from effective position, said latch means comprising a pawl having two abutments each adapted to hold one section of said control element, a lock for said pawl provided with two groups of control means, one group adapted to cooperate with said pawl to free said control element from both abutments of said pawl simultaneously, and the other group adapted to free the sections of said control element from said pawl in succession.

7. In a stop mechanism, the combination of a driven member, a control element mounted for movement between starting and stopping positions, latch means for holding said element in starting position, latch actuating means including a plurality of selectively presettable control means adapted to be initially positioned to permit a predetermined operation of said driven member, a plurality of presetting means, each adapted to preset a particular control means, means operated in proportion to the operation of said driven member for driving said presettable control means toward latch actuating position, and power means operable thereafter for driving all of said presetting means for resetting all of said control means to their initial positions.

8. In a stop mechanism, the combination of a driven member, a control element movable between stopping and starting positions, releasable means for holding said element in starting position, releasing means comprising presettable means connected to be driven by said driven member from preset position to stopping position, said releasing means being arranged to release said holding means when said presettable means reach the stop position, power means for automatically returning said presettable means to preset position after the release of said holding means, and connections between said control element and said power means for conditioning the latter for a succeeding operation.

9. In a stop mechanism, the combination of a control element having two associated parts, the first part being mounted for movement between part speed and stopping positions and the second being mounted for movement relative to the other to full speed position, means for holding said parts in part speed and full speed positions respectively, means for releasing said holding means, first to permit said second part to move from full speed position and thereafter to permit said first part to move to stopping position, said releasing means comprising tripping members having stop and starting positions, means for resetting said tripping members from stop to starting positions comprising power means, and means under control of said first part for preventing resetting operation of said power means except during the movement of said first part to stopping position.

10. In a stop mechanism, the combination of a driven member, a plurality of tripping members each having a tripping position, manual means for individually moving said tripping members away from said tripping positions to preset positions, means for thereafter locking said manual means together, means for driving said tripping members toward active positions in proportion to the operation of said driven member, stop means controlled by said tripping members, adapted to move to stopping position when the tripping positions are reached and means for actuating said locked manual means for simultaneously restoring said tripping members to said preset positions when said stop means moves to stopping position.

11. In a stop mechanism, the combination of a driven member, a plurality of tripping members each having a tripping position, manually operable means connected to drive said tripping members individually in one direction to preset positions, means connecting said tripping members to be driven in said presetting direction, relative to said manually operable means, by said driven member, and power means connected to drive said manually operable means simultaneously one revolution in the same direction to return the tripping members to preset position.

12. In a stop mechanism, a control element mounted for movement between starting and stopping positions, means for holding said element in starting position, means for releasing said holding means comprising control members having starting and stopping positions, presetting means operable to initially move each of said control members to a preselected starting position, power means, including said presetting means, for moving said control member simultaneously to their preselected starting positions after each operation of said releasing means, and means connecting said control element to condition the power means for a succeeding operation upon movement of the former to starting position.

13. In a stop mechanism, a control element mounted for movement between starting and stopping positions, means for holding said element in starting position, means for releasing said holding means comprising control members having starting and stopping positions, presetting means operable to initially move each of said control members to a preselected starting position, and power means, said power means comprising a power storing element, means connecting said element to be stressed by movement of said control element to starting position and to be released upon release of said holding means, and means, including said presetting means, driven by said power means and said connecting means for actuating said control members simultaneously to their preselected starting positions upon release of said holding means.

14. In a stop mechanism, the combination of a driven member, a plurality of tripping members each having a tripping position, manually operable means connected to drive said tripping members individually in one direction to preset positions and to move independently of said tripping members in a reverse direction, means connecting said tripping members to be driven toward tripping position in said presetting direction relative to said manually operable means by said driven member, a control element movable from stopping to starting position in two stages, means operable by movement of said control element to starting position for moving said manually operable means in said reverse direction, and power means operable during the second stage movement of, and under control of said control element, for driving said manually operable means in said first named direction to preset position.

15. In a stop mechanism, the combination of a driven member, a plurality of tripping members each having a tripping position, manually operable means connected to drive said tripping members individually in one direction to preset positions and to move independently of said tripping members in a reverse direction, means for thereafter interconnecting said manually operable means to cause them to move in unison, means connecting said tripping members to be driven toward tripping position in said presetting direction relative to said manually operable means by said driven member, a control element movable between stopping and starting positions, means operable by movement of said control element to starting position for moving said manually operable means in said reverse direction, power means, under control of said control element, for driving said manually operable means in said first named direction, the amplitude of movement of said interconnected manually operable means in each direction being substantially the same.

16. In a stop mechanism, the combination of a driven member, a plurality of tripping members each having a tripping position, manually operable means connected to drive said tripping members individually in one direction to preset positions and to move independently of said tripping members in a reverse direction, means connecting said tripping members to be driven toward tripping position in said presetting direction relative to said manually operable means by said driven member, a control element movable between stopping and starting positions, means operable by movement of said control element to starting position for moving said manually operable means in said reverse direction, power means, under control of said control element, for driving said manually operable means in said first named direction, the amplitude of movement of all of said manually operable means in each direction being substantially the same and being at least one revolution, whereby said tripping elements will be restored to their initial preset positions.

17. In a stop mechanism, the combination of a driven member, a bodily movable control element comprising a first section which is movable from a stop position to an actuated position, and a second section which is movable from a stop position adjacent said first section to a starting position remote from said first section, a withdrawable pawl provided with stops, one for holding said first section in actuated position and one for holding said second section in starting position, the stops being arranged so that upon withdrawal of the pawl said second section will be released prior to the release of said first section, means for withdrawing said pawl and means for urging said sections toward their stop positions.

18. In a stop mechanism, the combination of a driven member, a control element comprising a first section which is mounted for movement between a stop and an actuated position, and a second section connected with said first section and adapted to move between a position in abutting relation with said first section and a starting position remote from said first section and to actuate said first section, a withdrawable pawl provided with stops, one for holding said first section in actuated position and one for holding said second section in starting position, means for withdrawing said pawl including a tripping member, means for manually presetting said tripping member to a selected ineffective position, means connecting said tripping member with said driven member for operation toward tripping position, means, connecting said presetting means for operation by the second section of said control element, to condition it for automatically returning said tripping member to said ineffective position, and power means under control of said second section for actuating said last named connecting means.

CLEMENT P. GRIFFITH.